United States Patent
Siegler et al.

[11] Patent Number: 5,833,427
[45] Date of Patent: Nov. 10, 1998

[54] STORAGE RACK

[75] Inventors: Adrian Siegler, Belheim; Norbert Bouche, Kuhardt, both of Germany

[73] Assignee: Bellheimer Metallwerk GmbH., Bellheim, Germany

[21] Appl. No.: 610,540

[22] Filed: Mar. 6, 1996

[30] Foreign Application Priority Data

Mar. 31, 1995 [DE] Germany .......................... 195 13 179.7

[51] Int. Cl.$^6$ ......................................................... B65G 1/04
[52] U.S. Cl. ............................................. 414/277; 414/286
[58] Field of Search ...................................... 414/277, 280, 414/281, 282, 206, 331

[56] References Cited

U.S. PATENT DOCUMENTS

| | | | |
|---|---|---|---|
| 2,624,470 | 1/1953 | Geirt ....................................... | 414/286 X |
| 3,757,967 | 9/1973 | Colbridge ............................... | 414/277 X |
| 4,998,856 | 3/1991 | LaBarre ................................. | 414/286 X |
| 5,032,053 | 7/1991 | Krieg ..................................... | 414/282 X |
| 5,104,277 | 4/1992 | Bullock ................................. | 414/286 X |
| 5,183,370 | 2/1993 | Cruz ...................................... | 414/277 X |
| 5,599,154 | 2/1997 | Holscher et al. ....................... | 414/277 X |

FOREIGN PATENT DOCUMENTS

| | | |
|---|---|---|
| 42 33688 | 4/1994 | Germany . |
| 42 33690 | 4/1994 | Germany . |
| 3-177213 | 8/1991 | Japan ....................................... 414/277 |
| 3-228540 | 10/1991 | Japan ....................................... 414/286 |
| 4-201910 | 7/1992 | Japan ....................................... 414/277 |

*Primary Examiner*—Stephen T. Gordon
*Attorney, Agent, or Firm*—Mark P. Stone

[57] ABSTRACT

In the case of a storage rack, in each case a plurality of load carriers (9, 10) are assigned to the storage locations, the load carriers forming a load-carrier stack. The load-carrier stacks can be transferred from the respective storage locations, with the aid of a vertically displaceable storage and retrieval apparatus (6), to a charging and removal location (4) of the rack. In this arrangement, the storage and retrieval apparatus is provided with a lifting mechanism which exhibits pivot levers (24), arranged in pairs to the sides of the load carriers (9, 10), and which makes it possible to separate the load carriers (9, 10) from one another in the region of the charging and removal location (4) by raising up the respectively top load carrier (10) from a load-carrier stack comprising two load carriers. In order to be able to remove storage items from the bottom load carrier (9), it is only the latter which is transferred into the region of the charging and removal location (4), whereas, for removal from the top load carrier (10), the entire load-carrier stack carries out a horizontal movement.

12 Claims, 3 Drawing Sheets

STORAGE RACK

BACKGROUND OF THE INVENTION

The invention relates to a storage rack having a multiplicity of pairs of supports, arranged one above the other at a distance A apart from one another, for load carriers which, with the aid of a vertically displaceable storage and retrieval apparatus, can be transferred from at least one charging and removal location to storage locations of the rack or can be conveyed from said storage locations to the charging and removal location.

A storage rack of the type in question is known from DE 42 33 688 A1. The known rack exhibits two mutually opposite storage-location columns, between which a storage and retrieval apparatus is guided such that it can be moved up and down in a shaft, it being possible to use said storage and retrieval apparatus to retrieve load carriers from the rack and to store them in the rack, the retrieval apparatus having drivers, as is known from DE 42 33 690 C2, by means of which the load carriers can be displaced horizontally back and forth both in the region of the storage locations and in the region of the charging and removal location. In the case of the known storage rack, the supports are formed by rail pairs which can be fitted into the side walls of a housing, the minimum distance between the successive rail pairs being determined by a perforated grid with predetermined grid spacings.

In practice, the minimum distance between successive supports is subject to economic limits. Distances of less than 70 to 80 mm between supports are inexpedient, in particular, when the supports comprise elements which are formed by protuberances of the side walls of the rack. The conditions indicated above are not satisfactory, in particular, when the intention is to store on the load carriers, for example, small items having a height of only 20 to 30 mm. In order, nevertheless, to be able to put the volume of the storage locations to some good use in such cases, load carriers with a plurality of drawers arranged one above the other in a housing have been-developed. However, load carriers of this type are not only expensive, but also leave something to be desired as far as their handling is concerned.

SUMMARY OF THE INVENTION

The object of the invention is to design a storage rack of the generic type in question such that more than just one load carrier can be assigned to a storage location, and such that it is possible to gain access, without difficulty, to that load carrier stored in a storage location on which the desired items have been deposited. This object is achieved according to the invention, in the case of a storage rack of the type in question, in that said storage rack is equipped with load-carrier stacks which exhibit a plurality of load carriers arranged one above the other, in that the storage and retrieval apparatus is provided with a lifting mechanism by means of which, if required, at least one load carrier can be transferred from a position in which it is supported on a load-carrier-stack load carrier located beneath it into a position in which it is at a distance a from the latter load carrier, and in that the load carriers arranged beneath the load carrier raised up by the lifting mechanism can be transferred, independently of the respectively raised-up load carrier and of any further load carriers which may be supported thereon, by means of the storage and retrieval apparatus, by way of a horizontal movement, into the region of the charging and removal location or from the latter onto the storage and retrieval apparatus.

In the case of the storage rack according to the invention, the storage and retrieval apparatus is used to remove the load-carrier stacks, in the same way as the known individual load carriers, from the respective storage location and to transfer them into the region of the charging and removal location or else to convey them from said region to the respective storage location. The advantage of the storage rack according to the invention consists in the fact that, in the region of the charging and removal location, provision is made for the situation where, during the displacement of the load carriers from the-storage and retrieval apparatus to the charging and removal location, it is in each case the load carrier from which storage items are to be removed or into which storage items are to be deposited which is transferred into an access position. In other words, if access to storage items in the uppermost load carrier of a load-carrier stack is required, then the entire load-carrier stack is displaced horizontally to the charging and removal location, whereas, if access to storage items in the lowermost load carrier of a load-carrier stack is required, then it is only this load carrier which undergoes horizontal movement.

A solution in which in each case only two load carriers arranged one above the other form a load-carrier stack has proven to be particularly expedient. The simplicity of such an embodiment makes it easier to retrofit known storage racks already in use and thus makes it possible to double their storage area with a low degree of outlay.

Further details and features of the invention are given in the subclaims and in the following description of an embodiment of the invention. Said embodiment is represented in the accompanying drawing, in which:

DESCRIPTION OF THE BEST MODES FOR CARRYING OUT THE INVENTION

Figure 1:
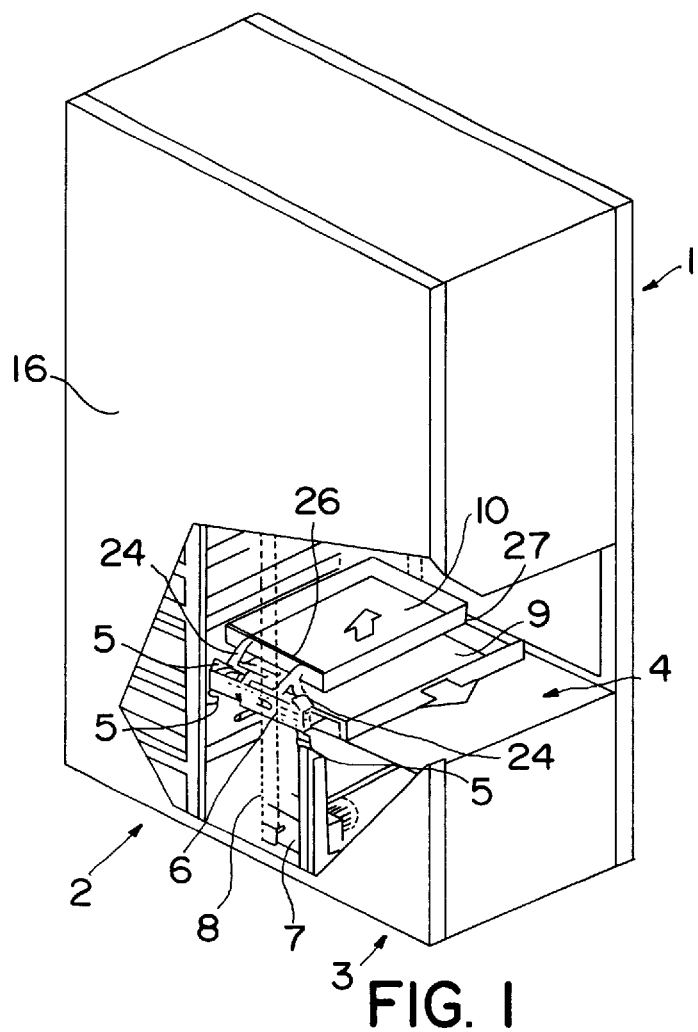
FIG. 1 shows, partially in section, the overall view of a storage rack.
Figure 2:
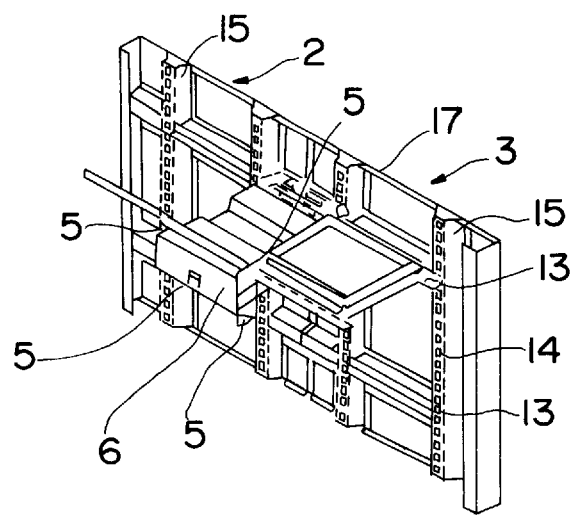
FIG. 2 shows details of part of a side wall of the rack according to FIG. 1.
Figure 3:
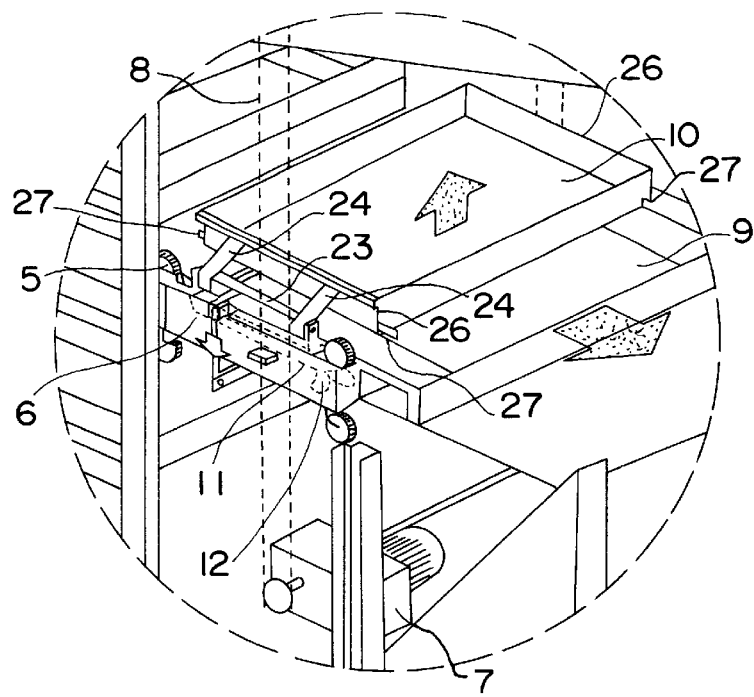
FIG. 3 shows details of the storage and retrieval apparatus of the rack according to FIG. 1.

In FIG. 1, 1 is the housing of a storage rack which exhibits two mutually opposite storage-location columns 2 and 3, the front one of which is provided with an opening which forms a charging and removal location 4. A storage and retrieval apparatus 6 is arranged between the storage-location columns 2 and 3 such that it can be displaced vertically, by means of rollers 5, in a shaft bounded by the storage-location columns and the side walls of the housing 1, a chain 8 which can be set in motion by a gear motor 7 serving to drive said storage and retrieval apparatus. The storage and retrieval apparatus 6 is provided, in a known manner, with means which permit a horizontal displacement of the load carriers 9, 10 which are to be transferred onto it or else are already located on it. These means include a drive train 11, indicated in FIG. 3, with drivers 12.

The load carriers 9 and 10 form load-carrier stacks in each case, these being stored in the storage locations arranged one above the other. As can be seen from FIG. 8, the smallest distance A between the respectively successive storage locations is determined by supports 13 formed by rails. The supports 13 are fitted into holes 14 of profiled carriers 15 in the region of the side walls 16, 17 of the housing 1.

Figure 4:
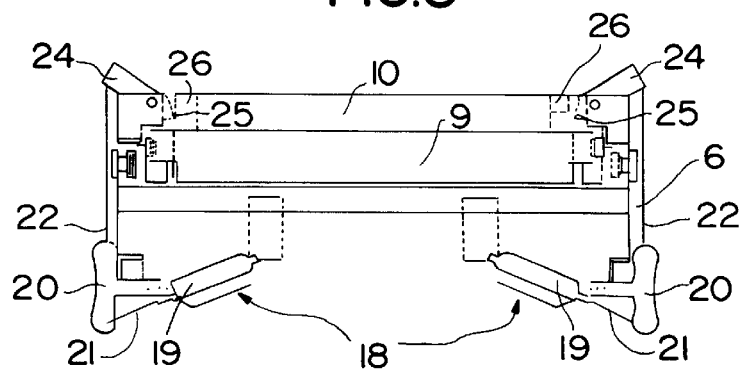
FIG. 4 shows the front view of the load carriers of a load-carrier stack, comprising load carriers, of the rack according to FIG. 1 in a first position.

Since a plurality of load carriers 9, 10 can be transferred in a storage location in each case, the storage area of the individual storage locations can be increased. It is thus possible, in particular, to make more than single use of the volume of the storage location predetermined by the smallest possible distance A, i.e. in the case described the use of said volume is essentially doubled. The rack described is thus particularly suitable for storing small items, i.e. items of low height. In order to ensure that the improved utilization of space of the rack is not adversely affected by difficult access to the individual load carriers, the storage and retrieval apparatus 6 is provided with a lifting mechanism 18 of the type represented in FIGS. 4 and 5. The lifting mechanism can be used, in the exemplary embodiment described, to raise up the load carrier 10, if required, in order then merely for the bottom load carrier 9 to be displaced horizontally, i.e. to be transferred to the charging and removal location 4 or else to be conveyed from said location back to the storage and retrieval apparatus 6.

Figure 5:
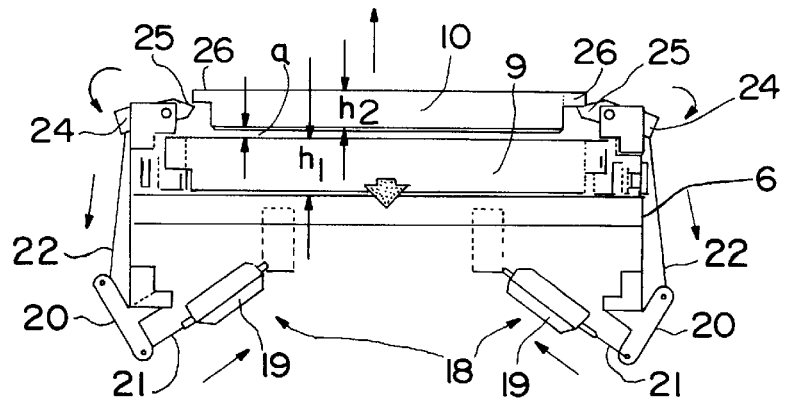
FIG. 5 shows the front view of the load carriers of the load-carrier stack of the rack according to FIG. 1 in a second position.

The lifting mechanism 18 includes two linear drives 19 which are connected, via in each case one link chain formed by a pivot lever 20 and two connecting rods 21, 22, to in each case two pivot levers 24 which are connected to one another by a longitudinal carrier 23. As is shown in FIG. 5, the linear drives 19 can initiate a pivot movement in the pivot levers 24, with the result that the ends 25, which face the load carrier 10, of the pivot levers 24 come into engagement with strip-like stops 26 in order to raise up the load carrier 10. During the raising-up operation, locking elements 27 arranged on the load carrier 10 release the load carrier 9, and the latter assumes a distance a from the load carrier 10. The designation "a" shown in FIG. 5 represents the distance between the load carriers when load carrier 10 is in a raised position elevated above load carrier 9.

Figure 6:
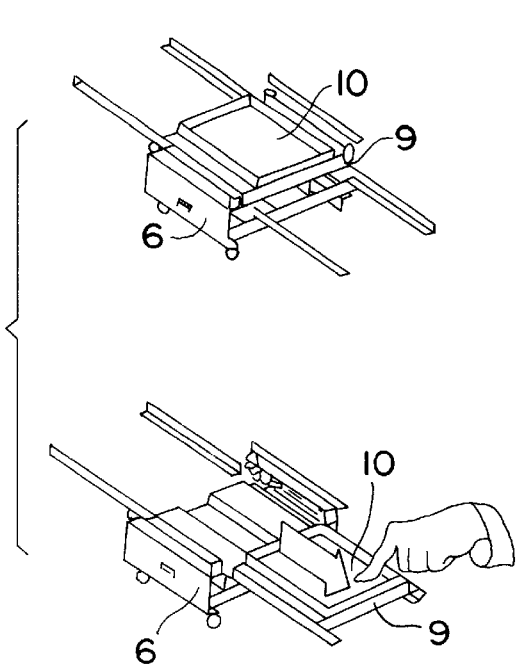
FIG. 6 shows the retrieval of a load-carrier stack for the purpose of removing storage items from the uppermost load carrier of the stack.
Figure 7:
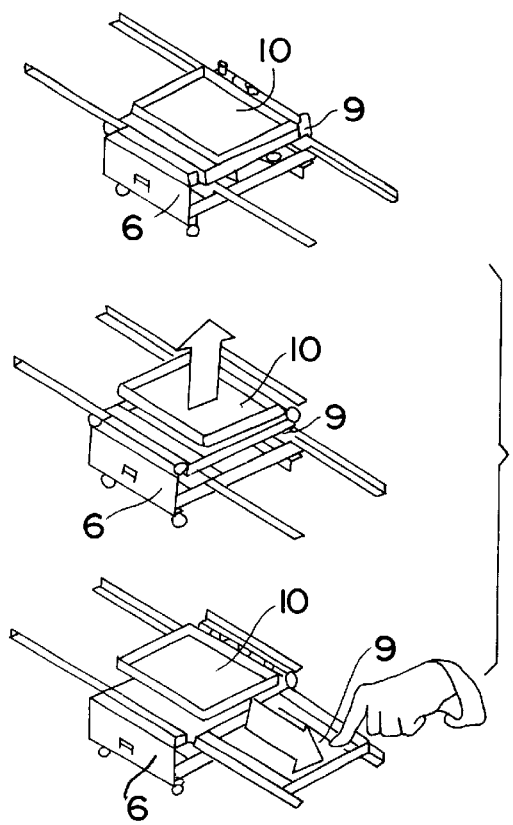
FIG. 7 shows the extraction of the bottom load carrier of a load-carrier stack for the purpose of removing storage items from the bottom load carrier.

FIGS. 6 and 7 represent schematically once again the two possible ways of gaining access to the load carriers 9 and 10 of the storage rack described. In FIG. 6, the entire load-carrier stack has been extracted, whereas in FIG. 7 it is only the bottom load carrier 9 of the load-carrier stack which has been extracted, once the top load carrier 10 has been raised up.

Figure 8:
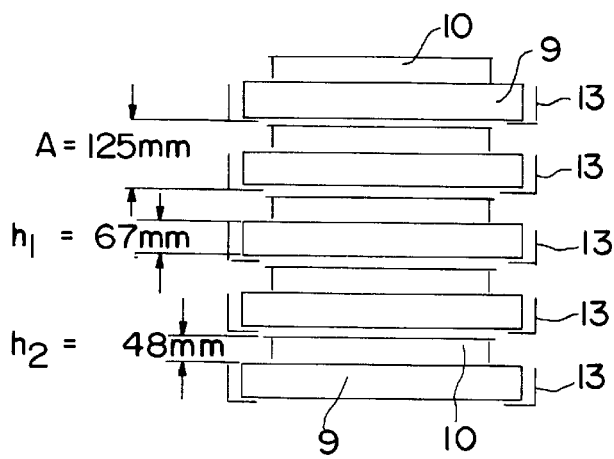
FIG. 8 shows an example for utilizing the height of a storage location between successive supports of a storage rack.

Finally, FIG. 8 shows the distance A, predetermined by successive supports 13, between individual storage locations divided up for practical requirements. FIG. 8 shows that the heights h 1 and h 2 of the tray-like load carriers 9 and 10 do not have to be equal. It is sufficient for the sum h 1+h 2+a, in the example represented, to be less than A.

We claim:

1. A storage rack comprising a plurality of pairs of supports for load carriers, said pairs of supports being arranged one above the other and separated by a distance A; a vertically displaceable storage and retrieval apparatus for transferring said load carriers from at least one charging and removal location to at least one storage location of the rack, or from said at least one storage location of the rack to said at least one charging and removal location; said rack having at least one load-carrier-stack formed from a plurality of said load carriers (9, 10) arranged one above the other; said storage and retrieval apparatus (6) having a lifting mechanism (18) for transferring at least a first one of said load carriers (10) from a position in which it is supported on a second one of said load carriers (9) located therebeneath in said load-carrier-stack into a position in which said first one of said load carriers (10) is elevated a distance above said second one of said load carriers (9); said storage and retrieval apparatus (6) comprising means for moving said second of said load carriers (9) in a substantially horizontal direction independent of said first one of said load carriers (10) or any other of said load carriers in said load-carrier-stack and supported on said first one of said load carriers (10), into the region of said charging and removal location (4) or from said charging and removal location (4) and onto said storage and retrieval apparatus (6), wherein each of said load-carrier-stacks is formed from only two of said load carriers (9, 10) arranged one above the other, wherein the load carriers (9, 10) are of respective heights h 1 and h 2, and the distance A between two successive supports (13) of one said pair of supports is greater than the sum of said respective heights h 1 and h 2 and "a", where "a" represents the distance between said two load carriers (9, 10) arranged one above the other in a raised position of the upper load carrier (10) relative to the lower load carrier (9).

2. The storage rack as claimed in claim 1, wherein said rack includes sidewalls, and the supports (13) are formed by rails fitted in holes (14) in the region of said sidewalls (16), 17) of the rack.

3. The storage rack as claimed in claim 2, wherein each of said load carriers (9, 10) comprises a tray.

4. The storage rack as claimed in claim 1 further including locking means for securing said load carriers (9, 10) in respective positions relative to each other in said load-carrier-stack.

5. A storage rack comprising a plurality of pairs of supports for load carriers, said pairs of supports being arranged one above the other and separated by a distance A; a vertically displaceable storage and retrieval apparatus for transferring said load carriers from at least one charging and removal location to at least one storage location of the rack, or from said at least one storage location of the rack to said at least one charging and removal location; said rack having at least one load-carrier-stack formed from a plurality of said load carriers (9, 10) arranged one above the other; said storage and retrieval apparatus (6) having a lifting mechanism (18) for transferring at least a first one of said load carriers (10) from a position in which it is supported on a second one of said load carriers (9) located therebeneath in said load-carrier-stack into a position in which said first one of said load carriers (10) is elevated a distance above said second one of said load carriers (9); said storage and retrieval apparatus (6) comprising means for moving said second of said load carriers (9) in a substantially horizontal direction independent of said first one of said load carriers (10) or any other of said load carriers in said load-carrier-stack and supported on said first one of said load carriers (10), into the region of said charging and removal location (4) or from said charging and removal location (4) and onto said storage and retrieval apparatus (6), wherein said lifting mechanism (18) includes pivot levers (24) arranged in pairs on opposed sides of said first one of said load carriers (10), said pivot levers having ends (25) facing said first one of said load carriers (10) for engaging stops (26) of said first one of said load carriers (10) for elevating said first one of said load carriers (10) during pivoting movement of said pivot levers.

6. The storage rack as claimed in claim 5, wherein each of said levers in a respective said pair of said pivot levers (24) arranged on each side of said first one of said load carriers (10) are connected to each other by a longitudinal carrier (23) pivotably mounted on said storage and retrieval apparatus (6).

7. The storage rack as claimed in claim 6, further including a linear drive (19) coupled to each said longitudinal carrier (23) via a connecting link (20, 21, 22), said linear drive (19) adapted to initiate a pivoting movement of said respective longitudinal carrier (23).

8. The storage rack as claimed in claim 5, wherein each of said load-carrier stacks is formed from only two of said load carriers (9, 10) arranged one above the other.

9. The storage rack as claimed in claim 8, wherein the load carriers (9, 10) are of respective heights h 1 and h 2, and the distance A between two successive supports (13) of one said pair of supports is greater than the sum of said respective heights h 1 and h 2 and "a", where "a" represents the distance between said two load carriers (9, 10) arranged one above the other in a raised position of the upper load carrier (10) relative to the lower load carrier (9).

10. The storage rack as claimed in claim 5, wherein said rack includes sidewalls, and the supports (13) are formed by rails fitted in holes (14) in the region of said sidewalls (16, 17) of the rack.

11. The storage rack as claimed in claim 10, wherein each of said carriers (9, 10) comprises a tray.

12. The storage rack as claimed in claim 5 further including locking means for securing said load carriers (9, 10) in respective positions relative to each other in said load-carrier-stack.

\* \* \* \* \*